United States Patent [19]

Harada

[11] Patent Number: 4,626,577

[45] Date of Patent: Dec. 2, 1986

[54] PROCESS FOR PREPARING A SOLUTION OF POLY(ALLYLAMINE)

[75] Inventor: Susumu Harada, Koriyama, Japan

[73] Assignee: Nitto Boseki Co., Ltd., Fukushima, Japan

[21] Appl. No.: 817,760

[22] Filed: Jan. 6, 1986

Related U.S. Application Data

[63] Continuation of Ser. No. 670,534, Nov. 13, 1984, abandoned.

[30] Foreign Application Priority Data

Nov. 14, 1983 [JP] Japan ............................. 58-213698

[51] Int. Cl.$^4$ ............................................. C08C 19/00
[52] U.S. Cl. ............................... 525/369; 525/328.2; 525/378; 526/277; 526/287; 526/291; 526/310
[58] Field of Search ............... 526/277, 287, 291, 310; 525/328.2, 369, 378

[56] References Cited

U.S. PATENT DOCUMENTS

| | | | |
|---|---|---|---|
| 2,926,161 | 2/1960 | Butler et al. | 526/291 |
| 3,032,538 | 5/1962 | Spauling et al. | 526/310 |
| 3,619,394 | 11/1971 | Battaerd | 526/291 |
| 3,912,693 | 10/1975 | Shimizu et al. | 526/291 |
| 4,121,986 | 10/1978 | Battaerd | 526/310 |
| 4,504,640 | 3/1985 | Harada et al. | 526/204 |

*Primary Examiner*—Joseph L. Schofer
*Assistant Examiner*—J. M. Reddick
*Attorney, Agent, or Firm*—Bert J. Lewen; Henry Sternberg

[57] ABSTRACT

A process for preparing a methanolic solution of poly(allylamine) is disclosed, wherein an inorganic acid salt of polyallylamine (e.g. hydrochloride, phosphate or sulfate) is ground into a fine powder, which powder is dispersed in a methanolic solution of caustic alkali (e.g. NaOH or KOH) or ammonia and treated at the temperature of 0° to 65° C. for a period of 10 hours or less.

3 Claims, No Drawings

PROCESS FOR PREPARING A SOLUTION OF POLY(ALLYLAMINE)

This is a continuation of copending application Ser. No. 670,534 filed on Nov. 13, 1984 now abandoned.

This invention relates to a process for the preparation of a solution of poly(allylamine).

Although poly(allylamine) so far has been considered as a substance which is very difficult to be prepared, the present inventors have found an industrial process to efficiently polymerize an inorganic acid salt of monoallylamine and filed applications for patent of said process as Japanese Patent Application No. 54,988/83 and U.S. Ser. No. 379,983, now U.S. Pat. No. 4,504,640.

In the process described in the specifications of Japanese Patent Application No. 54988/83 and of U.S. Ser. No. 379,983, an inorganic acid salt of monoallylamine is used, so that the obtained polymer also has a form of salt, namely, is an inorganic acid salt of poly(allylamine). For example, if a hydrochloride of monoallylamine is used, a hydrochloride of poly(allylamine) is obtained.

On the other hand, when amino groups of this polymer are subjected to some of various chemical reactions to be chemically modified, if the amino group is in the form of a salt, the reaction often hardly proceeds. Hence the free amine should be used for the reactions. For example, a poly(allylamine) should be prepared from a poly(allylamine hydrochloride). In this case generally one of the following methods is employed:

(a) An aqueous solution of poly(allylamine hydrochloride) is neutralized with an alkali (e.g. caustic soda) to obtain an aqueous solution of poly(allylamine) containing solid sodium chloride, which is dialyzed to remove sodium chloride, thereafter concentrated and freeze-dried.

(b) An aqueous solution of poly(allylamine hydrochloride) is passed through a strongly basic ion exchange resin to be freed from hydrochloric acid, thereafter concentrated and freeze-dried.

Poly(allylamine) is soluble only in water and methanol, but insoluble in other solvents. Therefore, in case of chemical modification of poly(allylamine), water or methanol is used for the solvent. Practically, methanol is used in most cases, wherein a poly(allylamine) prepared by the above-mentioned process must be dissolved in methanol.

The object of the present invention is to provide a method for the preparation of a methanolic solution of poly(allylamine) directly from an inorganic acid salt of poly(allylamine).

The above object of the present invention has been attained by a method for preparing a methanolic solution of poly(allylamine) characterized by treating a powdered inorganic acid salt of poly(allylamine) with a methanolic solution of caustic alkali (e.g. caustic soda or caustic potash) or ammonia.

The inorganic acid salts of poly(allylamine) which are used in the present invention, preferably are hydrochloride, sulfate or phosphate of poly(allylamine). When these powdered inorganic acid salts of poly(allylamine) are dispersed into a methanolic solution of caustic alkali (e.g. caustic soda or caustic potash) or ammonia, and treated under stirring or shaking, the inorganic acid salts of poly(allylamine) are allowed to react with the alkali and the sodium salt, potassium salt or ammonium salt of the inorganic acids produced is precipitated and the free poly(allylamine) is dissolved in methanol. By filtering off the precipitated salt, a methanolic solution of poly(allylamine) is obtained.

The concentration of caustic alkali (e.g. caustic soda or caustic potash) or ammonia in a methanolic solution which is used in the present invention, is in a range of from 0.1 to 8 mol/l, preferably from 0.5 to 4 mol/l. The amount of an inorganic acid salt of poly(allylamine) preferably is less than the stoichiometrical equivalent to the alkali in methanol. The treating temperature is from 0° to 65° C. and the treating time is 10 hours or less.

In the following the methods for producing the hydrochloride, phosphate and sulfate of poly(allylamine) which are used in the present invention, are explained as reference examples.

REFERENCE EXAMPLE 1

Poly(allylamine hydrochloride)

In a 2 l round-bottomed flask equipped with a stirrer, a thermometer, a reflux condenser and a nitrogen gas inlet tube, 590 g (6 mols) of monoallylamine hydrochloride and 210 g of distilled water are placed and stirred to dissolve the salt and obtain a 70% aqueous solution of monoallylamine hydrochloride. Introducing nitrogen gas into the flask, the solution is heated to 50° C. Then, an aqueous solution of 14 g of 2,2'-diamidinyl-2,2'-azopropane dihydrochloride dissolved in 30 ml of distilled water is added into the above solution, which is stirred at the temperature of from 48° to 52° C. for 70 hours to be subjected to polymerization. A colorless transparent, viscous solution thus obtained is added into a large amount of methanol and a white polymer precipitate is produced. This precipitate is filtered off, extracted with methanol using a Soxhlet extractor for 15 hours, thereafter dried at 50° C. in vacuo, and 503 g of poly(allylamine hydrochloride) is obtained. This poly(allylamine hydrochloride) contains about 5% of adsorbed water.

REFERENCE EXAMPLE 2

Poly(allylamine phosphate)

In a 2 l reaction vessel equipped with a stirrer, a thermometer, a reflux condenser and a dropping funnel 1150 g of 85% phosphoric acid is placed, into which 285 g of monoallylamine is added dropwise under stirring at the temperature of from 10° to 30° C. After the addition, the mixture is heated to 50° C., and to the obtained solution of monoallylamine phosphate in phosphoric acid is added an aqueous solution of 5.7 g of 2,2'-diamidinyl-2,2'-azopropane dihydrochloride dissolved in 30 ml of distilled water. Since the reaction generates heat, the solution is kept at the temperature of 50°±2° C. under cooling to be subjected to polymerization for 50 hours. After the polymerization the obtained colorless transparent, viscous solution is added into a large amount of water and then a polymer precipitates in a form of rice cake. This precipitate is throughly washed with water and dried in vacuo at 80° C. The dried product is finely ground and then extracted with methanol using a Soxhlet extractor for 15 hours. After drying in vacuo at 50° C., 520 g of poly(allylamine phosphate) is obtained. According to the analysis this product has a composition of $(C_3H_7N)_3.2.H_3PO_4$, and this proves to be a polymer in which two molecules of phosphoric acid are attached to every three units of monoallylamine. This poly(allylamine phosphate) contains about 7% of adsorbed water.

REFERENCE EXAMPLE 3

Poly(allylamine sulfate)

In the reaction vessel used in Reference Example 2, 613 g of 80% sulfuric acid is placed. Into this 285 g of monoallylamine is added dropwise under cooling and stirring. After the addition, the mixture is heated to 50° C. and a uniform solution is obtained. Into this solution is added a solution of 5.7 g of 2,2'-diamidinyl-2,2'-azopropane dihydrochloride dissolved in 20 ml of distilled water. The mixture is kept at the temperature of 50°±2° C. and polymerized for 60 hours. After the polymerization the obtained colorless transparent, viscous solution is added into a large amount of water and then a polymer precipitates in a form of starch syrup. This precipitate is throughly washed with water and dried in vacuo at 80° C. The dried product is finely ground and then extracted with methanol using a Soxhlet extractor for 15 hours. After drying in vacuo at 50° C., 470 g of poly(allylamine sulfate) is obtained. According to the analysis this product has a composition of $(C_3H_7N)_2 \cdot H_2SO_4$, and this proves to be a polymer in which one molecule of sulfuric acid is attached to every two amino groups. This poly(allylamine sulfate) contains about 5% of adsorbed water.

In the following the present invention is concretely explained by the examples.

EXAMPLE 1

In a 1 L reaction vessel equipped with a stirrer, a thermometer and a reflux condenser, 500 ml of solution of one molar caustic soda in methanol is placed. Then 49 g of the poly(allylamine hydrochloride) (containing about 5% of adsorbed water) which has been obtained in Reference Example 1 and ground into a powder having a particle size of less than 100 meshes, is added and dispersed. This liquid dispersion is treated at 50° C. for 8 hours under stirring. After the treatment the liquid is cooled to the room temperature and the deposited sodium chloride is filtered off. Then a methanolic solution of poly(allylamine) is obtained.

EXAMPLE 2

In the reaction vessel employed in Example 1, 600 ml of solution of one molar caustic potash in methanol is placed. Then 39 g of the poly(allylamine phosphate) (containing about 7% of adsorbed water) which has been obtained in Reference Example 2 and ground into a powder having a particle size of less than 100 meshes, is added and dispersed. This liquid dispersion is treated at 60° C. for 12 hours under stirring. After the treatment the liquid is cooled to the room temperature and the deposited potassium phosphate is filtered off. Then a methanolic solution of poly(allylamine) is obtained.

EXAMPLE 3

In the reaction vessel employed in Example 1, 600 ml of solution of one molar ammonia in methanol is placed. Then 66 g of the poly(allylamine sulfate) (containing about 5% of adsorbed water) which has been obtained in Reference Example 3 and ground into a powder having a particle size of less than 100 meshes, is added and dispersed. This liquid dispersion is treated at 30° C. for 12 hours under stirring. After the treatment the deposited ammonium sulfate is filtered off, and then a methanolic solution of poly(allylamine) is obtained.

What is claimed is:

1. A process for the preparation of a methanolic solution of poly(allylamine) which comprises treating a powdered hydrochloride, phosphate or sulfate salt of poly(allylamine) with a methanolic solution of caustic alkali or ammonia.

2. A process according to claim 1 wherein the concentration of caustic alkali or ammonia in methanolic solution is in the range of from 0.1 to 8 mol/l.

3. A process for the preparation of a methanolic solution of poly(allylamine) which comprises treating a powdered hydrochloride, phosphate or sulfate salt of a poly(allylamine) with a methanolic solution of caustic alkali or ammonia, whereby an inorganic salt of said caustic alkali or ammonia is precipitated; filtering said methanolic solution to separate said inorganic salt and thereby obtaining a methanolic solution of poly(allylamine).

* * * * *